United States Patent [19]

Turnbull

[11] 4,036,907
[45] July 19, 1977

[54] POLY(META-PHENYLENE ISOPHTHALAMIDE) COMPOSITION

[75] Inventor: John William Turnbull, Wilmington, Del.

[73] Assignee: E. I. Du Pont de Nemours and Company., Wilmington, Del.

[21] Appl. No.: 630,409

[22] Filed: Nov. 10, 1975

Related U.S. Application Data

[62] Division of Ser. No. 466,016, May 1, 1974, Pat. No. 3,954,703, which is a division of Ser. No. 262,599, June 14, 1972, Pat. No. 3,925,323.

[51] Int. Cl.² .............................................. C08L 77/00
[52] U.S. Cl. ............................ 260/857 L; 260/37 M; 260/37 N; 260/78 R; 260/78 S; 260/857 UN
[58] Field of Search ........................... 260/857 L, 857

[56] References Cited

U.S. PATENT DOCUMENTS

| | | | |
|---|---|---|---|
| 2,975,128 | 3/1961 | Stott | 252/12 |
| 3,013,967 | 12/1961 | Miller | 260/857 L |
| 3,228,902 | 1/1966 | Beste | 260/79.2 |
| 3,287,288 | 11/1966 | Reiling | 260/4 |
| 3,287,324 | 11/1966 | Sweeny | 260/78 R |
| 3,661,823 | 5/1972 | Fix | 260/17.4 BB |

*Primary Examiner*—Paul Lieberman

[57] ABSTRACT

A poly(meta-phenylene isophthalamide) powder is provided which is coalescible under the influence of pressure followed by heating at temperatures below its crystalline melting point to provide molded objects of a solid and homogeneous nature. A process for preparing coalescible powders of poly(meta-phenylene isophthalamide) also is provided wherein a solution of said polymer in a solvent such as DMAC is added to a precipitant such as water to provide a slurry which is filtered, followed by washing and drying the resulting filter cake to provide a crumb which is ground and screened through a sieve of 35 mesh size (U.S. Standard).

3 Claims, No Drawings

POLY(META-PHENYLENE ISOPHTHALAMIDE) COMPOSITION

This is a division, of application Ser. No. 466,016, filed May 1, 1974 now U.S. Pat. No. 3,954,703 which is, in turn, a division of application Ser. No. 262,599, filed June 14, 1972, now U.S. Pat. No. 3,925,323.

FIELD OF THE INVENTION

The present invention relates to coalescible powders of organic polymeric material and, more particularly, the present invention is directed to coalescible powders of poly(meta-phenylene isophthalamide) and a process for the preparation of such powders.

BACKGROUND OF INVENTION

Polymers described as poly(meta-phenylene isophthalamides) are known and described in, for example, U.S. Pat. No. 3,287,324. These polymers are described in the aforementioned patent as being useful for the formation of fibers and films by ordinary solution spinning and solution casting techniques. Dispersions of poly(meta-phenylene isophthalamide) also are known and these are described in, for example, U.S. Pat. No. 3,228,902, which further discloses that the dispersions are useful as coating materials because of the low flammability characteristics thereof. There is no disclosure in any one of the aforementioned patents of coalescible powders of poly(meta-phenylene isophthalamide) or of processes for making such coalescible powders. Accordingly, it is the principle object of the present invention to provide coalescible powders of poly(meta-phenylene isophthalamide) and a process for preparing such powders.

THE INVENTION

According to the present invention there is provided a coalescible and densifiable powder of poly(meta-phenylene isophthalamide) having an apparent bulk density of at least about 0.02 g./cc., preferably between 0.1 g./cc. and 0.35 g./cc., a surface area greater than about 40 m.²/g. and a tensile strength greater than about 10,000 psi when coalesced into a shaped structure. The coalescible and densifiable poly(meta-phenylene isophthalamide) powder of the invention is characterized by a density of at least about 1.0 g./cc. when pressed into a preform which increases in density when sintered to a density of at least about 1.24 g./cc.

According to the present invention there is further provided a process for preparing a coalescible and densifiable powder of poly(meta-phenylene isophthalamide) which comprises adding a solution of up to about 3.5% by weight, based upon the total weight of said solution, of poly(meta-phenylene isophthalamide) in a suitable solvent to a precipitant thereby to form a slurry; agitating said slurry and thereafter filtering said slurry to recover solid particles of said poly(meta-phenylene isophthalamide); and thereafter washing and drying said solid particles and comminuting said solid particles thereby to provide a moldable powder of said poly(meta-phenylene isophthalamide).

DETAILED DESCRIPTION

The nature and advantages of the moldable powder and process of the present invention will be more clearly understood by the following more detailed description.

The present invention provides a powder of poly(-meta-phenylene isophthalamide), hereinafter referred to as PMPI, which may be formed into shaped articles by a direct-forming and free-sintering technique, hereinafter called DFS.

A salient feature of the present invention is the discovery of a PMPI powder which, after pressing into a preform, densifies upon sintering. Thus, an essential feature of the PMPI powder of the invention is that as a preform it is densifiable. The term densifiable, whenever used herein, means a PMPI powder which as a preform increases in density when it is sintered; more sepcifically, the PMPI powder when pressed into a preform which has a density of at least 1.0 g./cc. increases in density to at least about 1.24 g./cc. when sintered.

An important feature of poly(meta-phenylene isophthalamide) powders for DFS fabrication is that the bulk density thereof must be greater than about 0.02 g./cc. and, additionally, that the surface area thereof must be greater than about 40 m. ²/g. Preferably, the bulk density of the powder ranges between about 0.1 g./cc. and about 0.35 g./cc. PMPI powder having a density less than about 0.02 g./cc. has been found to be unsuitable for DFS fabrication because such powder does not flow sufficiently freely and requires a compaction ratio which is impractical. PMPI powder having a density above about 0.4 g./cc. has been found to be unsuitable for DFS fabrication because such powder lacks the ability to coalesce satisfactorily.

The high surface area and densifiable PMPI powder of the present invention may be formed into shaped articles by DFS fabrication during which the powder coalesces under the influence of heat and pressure at a temperature below its crystalline melting point to provide molded objects of a solid and homogeneous character. More specifically, the DFS fabrication of shaped structures entails first subjecting the PMPI powder decribed hereinabove to a compressive force of at least 10,000 psi, preferably 40,000 to 100,000 psi at a temperature up to about 250° C. thereby to provide a preform, and thereafter heating said preform in an inert atmosphere at a temperature between about 260° C. and about 320° C. thereby to coalesce the PMPI in said preform and provide a molded object of solid and homogeneous nature. The compressive force utilized for fabricating preforms of the PMPI powder is selected so as to provide a preform having a density of at least 1.0 g./cc., preferably between about 1.2 g./cc. and 1.3 g./cc. The compressive force required to achieve a dense shaped article may be supplied by means of a rolling mill or by means of pressure applied to a finely divided resin confined within a mold. The shaped article, called a preform, may be machined, postformed, or otherwise treated to produce the desired characteristics of the ultimate finished article. At this time imperfect moldings can be discovered and the material recycled through the precipitation process resulting in a savings in material. The compacted shaped article can then be heat-treated or sintered in an inert atmosphere at a temperature of between about 260° C. and about 320° C. without the use of pressure for a period sufficient to coalesce the PMPI of the preform and provide a solid molded article, e.g., a heating period of between about 5 minutes and about 12 hours, depending upon the temperatures used. If insufficient pressure is applied during the compaction step, sufficient coalescence will not take place upon subsequent heat treatment and the resultant article will lack useful properties such as high tensile strength.

The PMPI powder of the invention may be utilized either alone or in combination with other additives and materials for fabricating molded articles. Suitable additives and materials for combining with the PMPI powder of the invention include finely-divided metals, metal oxides, minerals, abrasive materials such as silicon carbide and diamonds, graphite, glass, molybdenum disulfide, cryolite, boron nitride, iron sulfide, sodium chloride, asbestos, clay, mica, vermiculite, kaolin, other particulate polymers which may comprise a halocarbon resin such as polytetrafluoroethylene, or mixtures of any of the foregoing materials. The halocarbon resin can be present in an amount between about 1% and about 75% by weight, based upon the total weight of the composition.

Coalescence of the PMPI powders, either alone or with added fillers such as graphite, clays, or abrasives, by the method of fabrication described above can be used to make standard shapes such as rods, tubes, and sheets which can be machined into a variety of articles or to form directly from the PMPI powder, either alone or with added materials such articles as bushings, seal faces, electric insulators, compressor vanes and impellers, pistons and piston rings, gears, thread guides, cams, brake linings, clutch faces, and abrasive articles such as wheels. In some applications as little as 5-10% by weight of the PMPI is required to provide an effective binder for particulate inorganic solids and will provide a strong article.

The coalescible PMPI powder of the invention is obtained by a process which comprises adding a solution of between about 0.5 and about 3.5% by weight, based upon the total solution weight, of PMPI and a suitable solvent into a precipitant. Suitable solvents for the PMPI solution include dimethylformamide (DMF) and dimethylacetamide (DMAC) or mixtures thereof. A slurry forms immediately upon adding the PMPI solution to the precipitant. The precipitant is a nonsolvent for the PMPI and suitable precipitants include water. A critical and essential feature of the invention is that the PMPI solution must be added to the precipitant so as to cause immediate precipitation. It has been discovered that PMPI powders not suitable for DFS fabrication are obtained if the precipitant such as water is added to the PMPI solution.

The slurry that is formed by adding the PMPI solution to the precipitant is agitated or stirred to intimately mix the PMPI solution and the precipitant, e.g., stirring the slurry for a period up to about 1 hour has been found to be satisfactory. Thereafter, the slurry is filtered, preferably by vacuum filtering techniques whereby to recover a filter cake of the PMPI. The filter cake of PMPI is washed to remove solvent and is prefeably broken or divided and dried as by placing the filter cake in an oven maintained at about 200+20° C. and at a reduced pressure of about 1 mm. of mercury. The resulting PMPI crumb is ground by any suitable means and then screened through a sieve of 35 mesh size (U.S. Standard). The resulting PMPI powder is suitable for DFS fabrication as above described. An advantageous feature of the process of the present invention for precipitating PMPI powder is that the process may be carried out at or near room temperature.

The present invention may conveniently be practiced as follows:

1. One part by volume of a solution of between about 1.5% and 2.5% by weight, based upon the total solution weight, of PMPI in DMF or DMAC is slowly added to one to two parts by volume of water at or near room temperature. The resulting slurry is stirred for about 1 hour, and thereafter, the slurry is vacuum filtered. The filter cake is washed free of solvent and then dried in a two-step process wherein (a) air or nitrogen at 100° C.-150° C. is circulated over and around the filter cake, and (b) the filter cake from (a) is placed in an oven at 180° C.-220° C. at less than about 1 mm. Hg. for about 10 hours. The dried PMPI crumb is ground in a Wiley Mill and screened through a 35-mesh (U.S. Standard) screen.

2. Preforms such as rectangular bars having a thickness of about 60 mils to 80 mils of PMPI powder may be prepared at room temperature by placing the PMPI powder in a floating die and applying a pressure of between 40,000 and 100,000 psi to the platens of the die. Self-supporting preforms are obtained which have densities between about 1.2 g./cc. and about 1.30 g./cc. (on a weight-volume basis). The preforms are then heated in accordance with the following sequence in an oven in which a nitrogen environment is maintained: 250° C. for about 10 hours; 250° C. to 300° C. for ½ hour; and 300° C. for 1 hour.

The principle and practice of the present invention will now be illustrated by the following Examples which are exemplary only and it is not intended that the invention be limited thereto since modifications in technique and operation will be apparent to anyone skilled in the art. All parts and percentages specified herein are by weight unless otherwise specified.

The test samples prepared in the following Examples were evaluated in accordance with the following procedures:

BULK DENSITY

The bulk density of the PMPI powder samples are obtained by adding dry samples of the powder to a graduated cylinder of 5 ml. capacity having a funnel-shaped top. The dry powder is allowed to flow down the wall of the cylinder and carefully, without tapping the cylinder, the volume and weight of the loosely packed sample are recorded.

SURFACE AREA

The surface area of dry PMPI powder samples were determined by the nitrogen absorption method using a Model 2200 Automatic Surface Area Analyzer manufactured by Micromeritics Instrument Company, Norcross, Georgia.

TENSILE PROPERTIES

Tensile properties including initial modulus, tenacity and elongation were measured using an Instron device operated at an extension rate of 0.2 inch per minute in accordance with ASTM No. D638-68, modified to the extent that APMI (American Powder Metallurgy Institute) standard test bars were employed.

INHERENT VISCOSITY

The inherent viscosity of the PMPI polymer samples was obtained by the standard solution viscosity technique by measuring solution flow time and solvent flow time in a Cannon-Fenske viscometer. Inherent viscosity was calculated from the following equation:

$$\text{Inherent Viscosity} = \frac{\text{Natural Logarithm} \frac{\text{Solution Flow Time, sec.}}{\text{Solvent Flow Time, sec.}}}{C}$$

where $C$ is the concentration expressed in grams of polymer per 100 milliliters of solution. The polymer solution was obtained by dissolving 0.5 gram of the polymer in an initial amount of solvent less than 100 mls. at 30° C., and then adjusting the total solution to 100 mls. by adding additional solvent at 30° C. The solvent used was concentrated sulfuric acid. As is known in the polymer art, inherent viscosity is related to the molecular weight of the polymer.

EXAMPLE 1

A solution of 19% by weight poly(meta-phenylene isophthalamide) (inherent viscosity 1.55) and 9% by weight calcium chloride in dimethylacetamide (DMAC) was diluted by stirring dimethylformamide (DMF) thereinto at room temperature to give a solution of 1.8% by weight of PMPI polymer.

The PMPI polymer solution, 2000 g., was added at a rate of 20–25 mls./min. into a flask containing 2 liters of rapidly stirred distilled water at room temperature. The resultant slurry was stirred for one hour and vacuum filtered. The precipitated polymer was washed three times by repeatedly reslurrying (to 1–2% solids) with distilled water at room temperature and filtering as above. Water was then rinsed from the polymer in a similar manner but using acetone in the wash cycle. The resulting filter cake was divided into small pieces which were dried for three days at room temperature under a reduced pressure of less than 1 mm. Hg. A dried crumb was obtained which was gentle ground to a powder with a mortar and pestle. Large agglomerates were removed by sifting the powder through a 35 mesh U.S. Standard screen. Final drying of the polymer powder was carried out in a vacuum oven at 200° C. under a reduced pressure of less than 1 mm. Hg.

The dry polymer powder had an apparent bulk density of 0.20 g./cc. and a surface area of 52 m.²/g.

Preforms in the shape of tensile test bars of between 60 and 80 mols thickness were pressed at room temperature and 60,000 psi pressure from thoroughly dried powder samples (200° C., less than 1 mm. Hg., overnight) using a standard APMI (American Powder Metallurgy Institute) test bar mold. Care was exercised to minimize polymer contact with atmospheric moisture before, during and following compaction. The resulting self-supporting preforms had a density of 1.25 g./cc. (on a weight-volume basis), a tensile strength of 2700 psi., a tensile modulus of 590,000 psi. and an elongation at break of 0.5%.

The preforms were next heated (sintered) in a nitrogen atmosphere within a well insulated oven in accordance with the following procedure: 250° C. for 15 hours; 250° to 300° C. for ½ hour; 300° C. for 1 hour. The specimens so treated had a density of 1,312 g./cc. (by water displacement), a tensile strength of 20,000 psi., a tensile modulus of 640,000 psi. and an elongation of 4.1%.

EXAMPLES 2-5

The powder described in Example 1 was used for making test specimens that were direct-formed and free-sintered (DFS) at forming pressures ranging from 20,000 psi. to 100,000 psi., and the performance evaluation of the test specimens are tabulated below:

TABLE I

| Example No. | Forming Pressure (psi.) | Preform Density (g./cc.) | Sintered Density (g./cc.) | Tensile Strength, ($10^3$ psi.)* | Tensile Modulus, ($10^3$ psi.)* | Elongation, %* |
|---|---|---|---|---|---|---|
| 2 | 20,000 | 1.10 | 1.301 | 18.0 (1.2) | 620 (340) | 3.7 (0.4) |
| 3 | 40,000 | 1.22 | 1.310 | 20.0 (2.5) | 650 (540) | 4.0 (0.5) |
| 4 | 80,000 | 1.28 | 1.311 | 19.0 (3.3) | 660 (650) | 3.6 (0.5) |
| 5 | 100,000 | 1.29 | 1.312 | 20.0 (3.4) | 660 (730) | 3.9 (0.5) |

*Values in ( ) are for preform or unsintered specimen.

EXAMPLES 6-10

The procedure of Example 1 was repeated using the solvents and concentrations of PMPI solution listed in Table 2 below, and the properties of the PMPI powder and molded test specimens thereof also are shown in Table 2 below:

TABLE 2

| Example No. | PMPI Solution Concentration, % | Solvent | Bulk Density, g./cc. | Surface Area, m²/g. | Forming Pressure psi | Preform Density, g./cc. | Sintered Density g./cc. | Tensile Strength, $10^3$ psi | Tensile Modulus $10^3$ psi | Elongation % |
|---|---|---|---|---|---|---|---|---|---|---|
| 6 | 2.5 | DMF | 0.03 | 64 | 100,000 | 1.28 | 1.324 | 20.6 | 660 | 4.9 |
| 7 | 2.1 | DMF | 0.11 | 68 | 100,000 | 1.29 | 1.318 | 22.0 | 687 | 4.5 |
| 8 | 1.85 | DMF | 0.14 | 73 | 100,000 | 1.27 | 1.321 | 23.2 | 678 | 5.1 |
| 9 | 1.80 | DMAC | 0.23 | 56 | 100,000 | 1.27 | 1.313 | 21.3 | 716 | 5.0 |
| 10 | 1.60 | DMF | 0.28 | 69 | 100,000 | 1.29 | 1.318 | 19.8 | 567 | 5.5 |

EXAMPLE 11

Six hundred mls. of 2% by weight poly(meta-phenylene isophthalamide) polymer solution, prepared as described in Example 1, was added to a round bottom flask. One liter distilled water was added, over a two-minute period, at room temperature, to the rapidly stirred polymer solution. The resulting slurry was stirred for 20 minutes and vacuum filtered. Following washing with distilled water and rinsing with acetone, the filter cake was divided into small pieces and dried under reduced pressure of less than 1 mm. Hg. at room temperature for 2 hours and at 100° C. for 2½ hours. The dried crumb was gently ground to a powder with a mortar and pestle. Large agglomerates were removed by sifting through 35 mesh U.S. Standard screen.

The dry powder was characterized by a bulk density of 0.14 g./cc. and a surface area of 14 m²/g. Molded test specimens prepared according to the procedure described in Example 1 had a preform density of 1.24 g./cc.; after sintering the test specimen had a density of 1.16 g./cc., a tensile strength of 3300 psi., a tensile modulus of 462,000 psi., and an elongation of 0.7%.

ground in a Thomas Cutter. Large agglomerates were removed by sifting through a 35 mesh U.S. Standard screen.

The properties of the PMPI powders so obtained and molded test specimens thereof (molded in accordance with the procedure described in Example 1) are listed in Table 3 below:

TABLE 3

| Example No. | Bulk Density, g./cc. | Surface Area, m²/g. | PMPI Solution Concentration, % | Precipitation Condition* | Forming Pressure, psi. | Preform Density, g./cc. | Sintered Density, g./cc. | Tensile Strength, 10³ psi. | Tensile Modulus, 10³ psi. | Elongation, % |
|---|---|---|---|---|---|---|---|---|---|---|
| 12 | 0.10 | 67 | 1.85 | B-1 | 20,000 | 1.08 | 1.309 | 22.2 | 658 | 4.8 |
| 13 | 0.10 | 67 | 1.85 | B-1 | 60,000 | 1.25 | 1.316 | 22.2 | 610 | 5.0 |
| 14 | 0.11 | 61 | 1.75 | A-2 | 60,000 | 1.25 | 1.318 | 19.7 | 654 | 3.8 |
| 15 | 0.21 | 62 | 1.50 | A-2 | 20,000 | 1.09 | 1.302 | 19.3 | 601 | 4.5 |
| 16 | 0.21 | 62 | 1.50 | A-2 | 60,000 | 1.25 | 1.301 | 19.3 | 700 | 3.9 |
| 17 | 0.29 | 62 | 1.50 | A-2 | 60,000 | 1.26 | 1.298 | 20.6 | 666 | 4.6 |
| 18 | 0.29 | 64 | 1.50 | A-1 | 20,000 | 1.08 | 1.300 | 15.3 | 570 | 3.6 |
| 19 | 0.29 | 64 | 1.50 | A-1 | 60,000 | 1.25 | 1.303 | 20.2 | 630 | 4.5 |
| 20 | 0.34 | 65 | 1.50 | A-2 | 20,000 | 1.09 | 1.300 | 13.7 | 610 | 3.2 |
| 21 | 0.34 | 65 | 1.50 | A-2 | 60,000 | 1.25 | 1.306 | 21.4 | 741 | 4.4 |

*A - Nozzle orifices were above the surface of the precipitant.
B - Nozzle orifices were below the surface of the precipitant.
1 - Nozzle discharge flow rate of about 1 gallon per minute using a multiple orifice nozzle.
2 - Nozzle discharge flow rate of about 0.2 gallon per minute using a single orifice nozzle.

This example illustrates that a coalescible and densifiable PMPI powder is not obtained when the precipitant is added to the PMPI polymer solution.

EXAMPLES 12-21

A solution of 19% by weight poly(meta-phenylene isophthalamide), inherent viscosity 1.55, and 9% by weight calcium chloride in dimethylacetamide (DMAC) was diluted by stirring DMAC thereinto at room temperature to give a solution of 1.5% by weight of PMPI polymer.

The PMPI solution, about 4 gallons, was discharged through a nozzle at a rate indicated in Table 3 below to 15 gallons of rapidly stirred distilled water at room temperature. The resulting slurry was stirred for one hour and vacuum filtered. The precipitated PMPI polymer was washed twice by reslurrying with 18 gallons of distilled water followed by filtration. The washed filter cake was divided into small pieces which were dried in a nitrogen swept tray dryer at 100° C. Final drying was done in a vacuum over at 200° C., and less than 1 mm. Hg. overnight. The dried polymer crumb was then

EXAMPLES 22-33

The powders prepared as directed in Examples 12-21 were blended with graphite, polytetrafluoroethylene or mixtures thereof to afford the compositions and molded test specimens thereof (molded in accordance with the procedure described in Example 1) listed in Table 4 below:

TABLE 4

| Example No. | Additive* Weight % PTFE | Additive* Weight % Graphite | Blending** Method | Preform*** Density g./cc. | Sintered Density g./cc. | Tensile Strength 10³ psi. | Tensile Modulus 10³ psi. | Elongation % |
|---|---|---|---|---|---|---|---|---|
| 22 | 1 | 0 | A | 1.24 | 1.308 | 18.4 | 709 | 3.6 |
| 23 | 0 | 1 | A | 1.24 | 1.311 | 17.9 | 740 | 3.3 |
| 24 | 10 | 0 | B | 1.30 | 1.363 | 13.8 | 570 | 3.1 |
| 25 | 1 | 10 | B | 1.30 | 1.369 | 10.3 | 751 | 1.9 |
| 26 | 15 | 0 | B | 1.33 | 1.398 | 14.0 | 540 | 3.8 |
| 27 | 7.5 | 7.5 | A | 1.31 | 1.384 | 10.8 | 561 | 2.9 |
| 28 | 5 | 10 | A | 1.31 | 1.382 | 8.7 | 626 | 2.0 |
| 29 | 0 | 15 | A | 1.30 | 1.391 | 8.3 | 696 | 1.5 |
| 30 | 15 | 15 | B | 1.44 | 1.502 | 4.0 | 700 | 1.2 |
| 31 | 30 | 0 | B | 1.42 | 1.500 | 6.6 | 330 | 3.0 |
| 32 | 50 | 0 | B | 1.55 | 1.609 | 3.4 | 370 | 2.5 |
| 33 | 70 | 0 | B | 1.74 | 1.786 | 1.5 | 230 | 1.0 |

*Polytetrafluoroethylene (PTFE) was Teflon® (TE6198) from E. I. du Pont Co., Wilmington, Del. Graphite was Airspun Graphite from Dixon Crucible Co., Jersey City, N.J.
**A - Dry blended components by tumbling or rolling in a suitable closed container.
B - Components were co-pulverized, dry-blended using a laboratory hammer mill from Cole-Parmer Instrument and Equipment Co., Chicago, Ill.
***Forming pressures were 60,000 psi.

What is claimed is:

1. A composition consisting essentially of a coalescible and densifiable powder of poly(meta-phenylene isophthalamide) having a density of between about 1.0 g./cc. and about 1.30 g./cc. when pressed into a preform and a density when sintered of at least about 1.24 g./cc. and between about 1% and about 75% by weight, based upon the total weight of said composition, of particulate halocarbon resin.

2. The composition of claim 1 wherein said halocarbon resin is a polymer of tetrafluoroethylene.

3. The composition of claim 2 wherein said polymer of tetrafluoroethylene is polytetrafluoroethylene.

* * * * *